US008760778B2

United States Patent
Mori (10) Patent No.: US 8,760,778 B2
(45) Date of Patent: Jun. 24, 2014

(54) LENS DEVICE

(75) Inventor: Yoshitaka Mori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 387 days.

(21) Appl. No.: 12/878,749

(22) Filed: Sep. 9, 2010

(65) Prior Publication Data

US 2011/0063742 A1 Mar. 17, 2011

(30) Foreign Application Priority Data

Sep. 17, 2009 (JP) ................ P2009-216032

(51) Int. Cl.
*G02B 7/02* (2006.01)
(52) U.S. Cl.
USPC .......................... 359/819; 359/827
(58) Field of Classification Search
USPC .......................... 359/819, 823–824
See application file for complete search history.

(56) References Cited

U.S. PATENT DOCUMENTS

| 4,908,647 | A | 3/1990 | Ueyama |
| 2006/0176584 | A1 | 8/2006 | Kawamura et al. |
| 2007/0229672 | A1 | 10/2007 | Kaneda |

FOREIGN PATENT DOCUMENTS

| EP | 1 403 673 | A2 | 3/2004 |
| JP | 9-43655 | A | 2/1997 |
| JP | 11-348761 | A | 12/1999 |
| JP | 2002-214504 | A | 7/2002 |
| JP | 2003-46817 | A | 2/2003 |
| JP | 2004-38060 | A | 2/2004 |
| JP | 2006-215420 | A | 8/2006 |
| JP | 2007-47542 | A | 2/2007 |
| JP | 2007-219023 | A | 8/2007 |

OTHER PUBLICATIONS

Japanese Office Action for Japanese Application No. 2009-216032, dated Feb. 22, 2013.

*Primary Examiner* — Alicia M Harrington
(74) *Attorney, Agent, or Firm* — Birch, Stewart, Kolasch & Birch, LLP (57) ABSTRACT

Disclosed is a rear-focus-type lens device in which a switch assembly including a plurality of switches can be provided in an attachment frame having, for example, a focus lens accommodated therein and which is capable of ensuring the strength of the attachment frame and the accuracy of the parts. A mounting frame provided on the rear side of a lens barrel body includes: an inner wall that partitions the inside of the mounting frame into a first space which accommodates an internal structure including, for example, a focus lens and a second space which accommodates a switch assembly including a plurality of switches for operating the lens device; and an opening of the second space which is formed in the side surface of the mounting frame and to which the switch assembly is attached. The strength of the mounting frame is ensured by the inner wall.

6 Claims, 12 Drawing Sheets

LENS DEVICE

CROSS-REFERENCE TO RELATED APPLICATIONS

This application is based upon and claims the benefit of priority from the Japanese Patent Application No. 2009-216032 filed Sep. 17, 2009; the entire contents of which are incorporated herein by reference.

BACKGROUND OF THE INVENTION

1. Field of the Invention

The present invention relates to a lens device and more particularly, to a lens device including a rear focus lens.

2. Description of the Related Art

JP-A-2007-219023 discloses a rear-focus-type lens device used in a portable ENG (Electronic News Gathering) camera for television news.

A rear-focus-type lens device has been proposed in which a switch is provided on the front side of the lens barrel body, but a structure has not been disclosed in which a plurality of switches for operating the lens device is provided in a rear fixed cylinder having, for example, a focus lens accommodated therein. In the lens device according to the related art, the lens barrel body is larger than the lens and there is an empty space for arranging a plurality of switches or a flexible printed circuit board.

However, in the lens device according to the related art, it is difficult to ensure an empty space for arranging a plurality of switches in front of the lens barrel body due to a reduction in the size of the rear-focus-type lens device.

For this reason, in the rear-focus-type lens device, a plurality of switches is provided in the rear fixed cylinder (attachment frame) having, for example, the focus lens accommodated therein.

Figure 13:
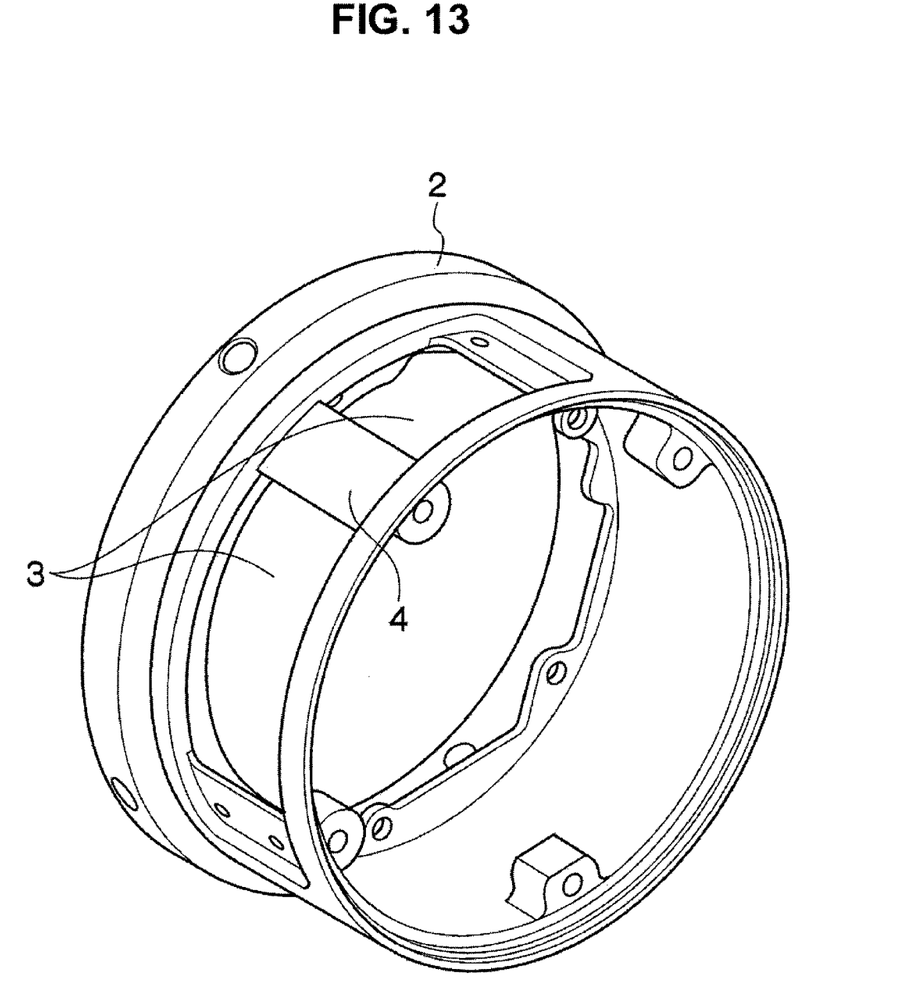
FIG. 13 is a perspective view illustrating the mounting frame considered at the beginning of development.

FIG. 13 is a perspective view illustrating an attachment frame at the beginning of development. As shown in FIG. 13, an opening 3 to which a switch cover (not shown) having a plurality of switches provided thereon is attached is formed in the side surface of the attachment frame 2 and a rib 4 is provided in the attachment frame 2 so as to avoid parts provided on the rear surface of the switch cover.

However, although the rib 4 is formed in the attachment frame 2, about one-third of the side surface of the attachment frame is cut out. Therefore, the strength of the attachment frame and the accuracy of the parts are reduced.

SUMMARY OF THE INVENTION

The invention has been made in order to solve the above-mentioned problems and an object of the invention is to provide a rear-focus-type lens device in which a plurality of switches can be provided in an attachment frame having, for example, a focus lens accommodated therein and which is capable of ensuring the strength of the attachment frame and the accuracy of parts as well as facilitating the wiring of switches without increasing the number of parts.

According to a first aspect of the invention, a rear-focus-type lens device includes: an attachment frame that is provided on the rear side of a lens barrel body; and an internal structure that includes a focus lens and is provided in the attachment frame. The attachment frame includes: an inner wall that partitions the inside of the attachment frame into a first space which accommodates the internal structure and a second space which accommodates a switch assembly including a plurality of switches for operating the lens device; and an opening of the second space which is formed in the side surface of the attachment frame and to which the switch assembly is attached. The strength of the attachment frame is reinforced by the inner wall.

According to the first aspect of the invention, the inner wall is formed at a position where it does not interfere with the internal structure and the inside of the attachment frame is partitioned into the first space and the second space. An opening to which the switch assembly is attached is formed in the side surface of the attachment frame in the second space, and the inner wall is formed inside the attachment frame at a position facing the opening to supplement the insufficient strength of the attachment frame due to the opening.

According to a second aspect of the invention, in the lens device according to the first aspect, the internal structure may include: the focus lens; a focus lens driving unit that drives the focus lens in the optical axis direction; a lens position detecting unit that detects the position of the focus lens; and a holding frame having the focus lens, the focus lens driving unit, and the lens position detecting unit provided therein.

According to a third aspect of the invention, in the lens device according to the second aspect, the holding frame may be provided with a first guide shaft, which is a standard for guiding a focus lens frame holding the focus lens so as to be movable in the optical axis direction, and a second guide shaft for regulating rotation. The lens position detecting unit may be provided at a position where it faces the focus lens with the first guide shaft interposed therebetween, and a pair of the focus lens driving units may be arranged at a position to be symmetric with respect to the first guide shaft and as close as possible to the first guide shaft.

According to a fourth aspect of the invention, in the lens device according to the third aspect, the attachment frame may have a cylindrical shape, and the holding frame may have an outward shape in which a portion close to the second guide shaft with respect to the optical axis is smaller than another portion close to the first guide shaft. That is, since each of the focus lens driving unit and the lens position detecting unit is arranged close to the first guide shaft, the outward shape of a portion of the holding frame that is close to the second guide shaft may be smaller than that of another portion thereof that is close to the first guide shaft. As a result, an empty space is formed on the second guide shaft side between the cylindrical attachment frame and the holding frame, and the inner wall is formed in the empty space at a position where it does not interfere with the holding frame.

According to a fifth aspect of the invention, in the lens device according to the third or fourth aspect, lead line outlets may be formed in a portion of the outer circumferential surface of the attachment frame close to the first guide shaft, and each of the switches in the switch assembly attached to the attachment frame may be electrically connected to a driving portion that is provided outside the lens barrel body through a flexible printed circuit board, a first connector mounted on the flexible printed circuit board, a second connector connected to the first connector, and a plurality of lead lines which is connected to the second connector and is drawn out from the lead line outlets.

According to a sixth aspect of the invention, in the lens device according to the fifth aspect, a U-shaped cut-out portion and a slit portion may be formed in the inner wall. The U-shaped cut-out portion may allow the second connector to slide in the optical axis direction and be inserted from the first space into the second space. The slit portion may communicate with the cut-out portion in the optical axis direction and the lead lines may be inserted into the slit portion. In this way, it is possible to attach the lead lines connected to the second connector to the inner wall of the attachment frame.

According to a seventh aspect of the invention, in the lens device according to the sixth aspect, a reinforcing plate may be provided on the rear surface of the flexible printed circuit board having the first connector mounted thereon. When the first connector is connected to the second connector, the reinforcing plate may come into contact with the side surface of the U-shaped cut-out portion protruding into the first space to prevent the sliding of the second connector. According to this structure, when the first connector and the second connector are connected to each other, the reinforcing plate that is provided on the rear surface of the flexible printed circuit board having the first connector mounted thereon comes into contact with the side surface of the U-shaped cut-out portion. Therefore, it is possible to prevent the sliding of the second connector and the disconnection between the first and second connectors.

According to an eighth aspect of the invention, in the lens device according to any one of the fifth to seventh aspects, two openings through which the second connector passes may be formed in the inner wall, and the second connector may pass through the two openings such that the lead lines connected to the rear end of the second connector extend along the inner wall.

According to a ninth aspect of the invention, in the lens device according to the eighth aspect, a flange portion and a plurality of screw bosses may be formed on the attachment frame. The flange portion may attach the attachment frame to the rear side of the lens barrel body and a cable holding boss may be formed in a part of the flange portion. The plurality of screw bosses may fix a mount ring including a lens mount to the rear side of the attachment frame. A cable, which is a bundle of the plurality of lead lines in the first space, extends among the flange portion of the attachment frame, the cable holding boss, and the inner wall and among the flange portion of the attachment frame, the lower surface of the screw boss, and the inner wall and is drawn out from the lead line outlet.

According to the eighth and ninth aspects of the invention, it is possible to easily extend the lead lines and the cable with only the structure of the attachment frame without increasing the number of parts. The lead lines do not hinder the arrangement of the holding frame in the attachment frame.

According to the above-mentioned aspects of the invention, in the rear-focus-type lens device in which the internal structure including the focus lens is provided in the attachment frame arranged on the rear side of the lens barrel body, the inner wall is formed in the attachment frame at a position where it does not interfere with the internal structure. The inner wall is formed in the attachment frame at a position facing the opening which is formed in the side surface of the attachment frame and to which the switch cover is attached. Therefore, it is possible to supplement the insufficient strength of the attachment frame due to the opening and maintain the accuracy of parts formed by molding.

DESCRIPTION OF THE PREFERRED EMBODIMENTS

Hereinafter, a lens device according to an embodiment of the invention will be described with reference to the accompanying drawings.

[Overall Structure of Lens Device]

Figure 1:
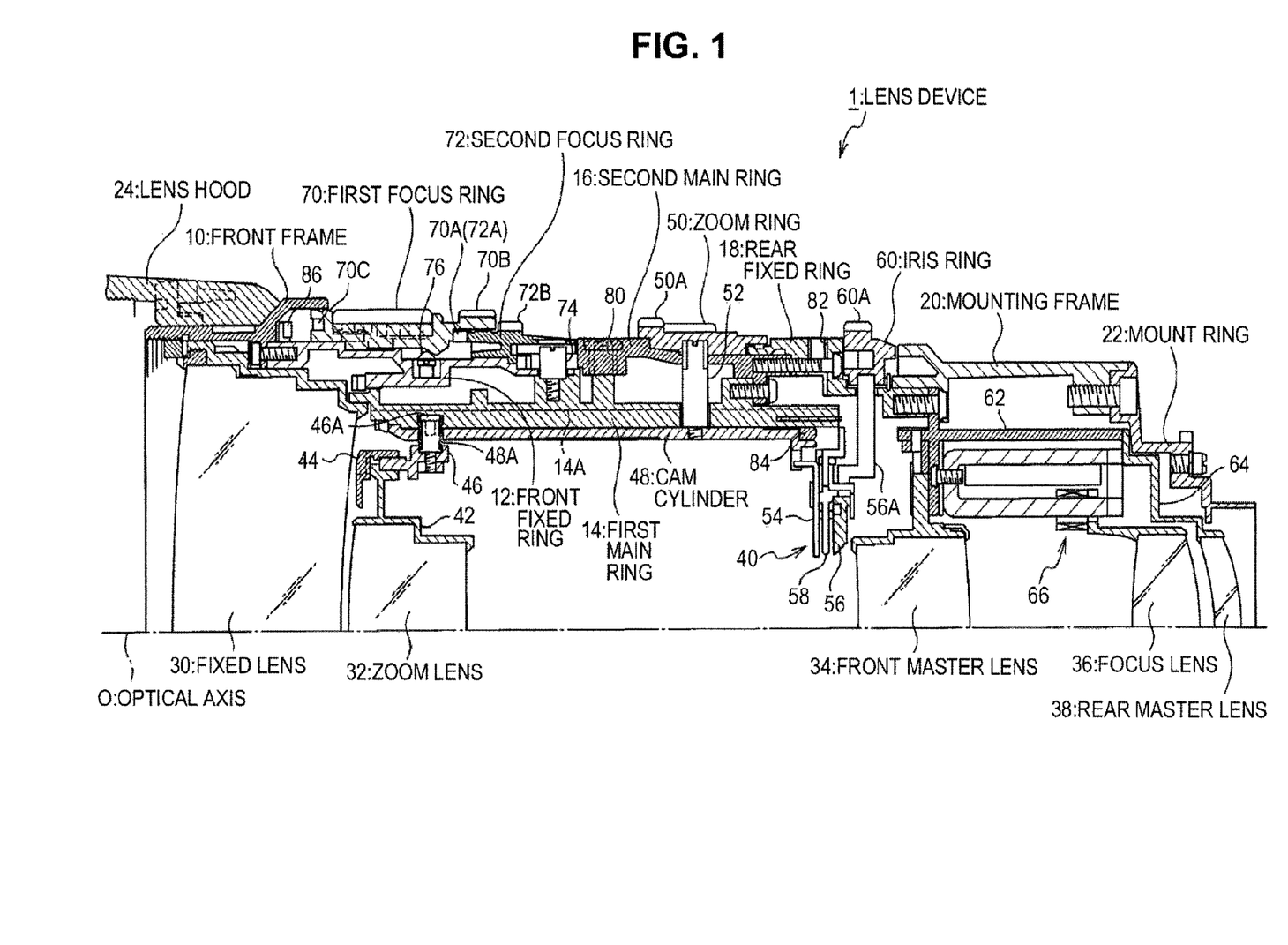
FIG. 1 is a side cross-sectional view illustrating a lens device according to an embodiment of the invention.

FIG. 1 is a side cross-sectional view illustrating a rear-focus-type lens device with a variable focal length according to an embodiment of the invention which is applied to, for example, a household video camera, an ENG camera for television broadcasting, or a monitoring camera and shows the upper half of the lens device from an optical axis O.

In FIG. 1, a lens barrel body of a lens device 1 has a substantially cylindrical shape and mainly includes a front frame 10, a front fixed ring 12, a first main ring 14, a second main ring 16, a rear fixed ring 18, a mounting frame 20, and a mount ring 22.

The first main ring 14 is a component that is disposed on the innermost side of the lens barrel body. The front fixed ring 12 is fixed to the front side of the outer circumference of the first main ring 14 by a screw and the front frame 10 is fixed to the front side of the front fixed ring 12 by a screw. The second main ring 16 is fixed to the rear side of the outer circumference of the first main ring 14 by a screw. In addition, the rear fixed ring 18 is fixed to the rear side of the second main ring 16 by a screw, the mounting frame 20 is fixed to the rear side of the rear fixed ring 18 by a screw, and the mount ring 22 is fixed to the rear side of the mounting frame 20 by a screw.

A lens hood 24 is mounted to the front frame 10. The lens device 1 is mounted to a camera body with interchangeable lenses through the mount ring 22.

An optical system of the lens device 1 includes five groups, that is, a fixed lens (first lens group) 30, a zoom (power variable) lens (second lens group) 32, a front master lens (third lens group) 34, a focus lens (fourth lens group) 36, and a rear master lens (fifth lens group) 38 which are arranged in this order from an object side. An iris diaphragm 40 is provided immediately before the front master lens 34.

A lens frame 42 to which the zoom lens 32 is attached is fixed to a moving frame 46 by a pressing ring 44. A cam cylinder 48 is rotatably held by an inner circumferential portion of the first main ring 14, and the moving frame 46 is held by the inner circumferential portion of the cam cylinder 48 through a cam pin 46A.

That is, a straight-ahead groove 14A is formed in the inner circumferential surface of the first main ring 14 in the direction of the optical axis O and a cam groove (cam-shaped hole) 48A is formed in the cam cylinder 48. The cam pin 46A fixed to the moving frame 46 is fitted to the straight-ahead groove 14A of the first main ring 14 through the cam groove 48A of the cam cylinder 48. In this way, the moving frame 46 is held so as to be movable straight in the direction of the optical axis O while the rotation thereof is restricted, and the cam pin 46A is held at the position where it is fitted to the cam groove 48A.

Therefore, when the cam cylinder 48 is rotated, the position where the cam groove 48A of the cam cylinder 48 intersects the straight-ahead groove 14A of the first main ring 14 is changed according to the shape of the cam and the moving frame 46 is moved forward and backward in the direction of the optical axis O by the movement of the cam pin 46A to the intersection position.

A zoom ring 50 is rotatably provided in the outer circumferential portion of the second main ring 16 and a rod-shaped connection shaft 52 is attached to the inner circumferential surface of the zoom ring 50 inward in the diametric direction. The connection shaft 52 passes through a long hole (not shown) that is formed in the first main ring 14 in the circumferential direction and is then connected to the cam cylinder 48. In this way, when the zoom ring 50 is rotated, the cam cylinder 48 is rotated in operative association with the movement of the zoom ring 50. When the cam cylinder 48 is rotated, the moving frame 46 is moved forward and backward as described above and the zoom lens 32 is moved in the direction of the optical axis O in operative association with the movement of the moving frame 46. Therefore, the zoom ring 50 is rotated to change the zoom ratio.

The iris diaphragm 40 mainly includes a bottom board (diaphragm frame) 54 made of plastic, a sliding plate (cam plate) 56, and a plurality of diaphragm blades 58 provided between the diaphragm frame 54 and the cam plate 56. An iris ring 60 is rotatably provided between the rear fixed ring 18 and the mounting frame 20 and a connection shaft 56A extending from the cam plate 56 is connected to the iris ring 60. In this way, the cam plate 56 is rotated by the rotation of the iris ring 60 and the diaphragm blades 58 are opened or closed.

The focus lens 36 changes the focus position of the optical system and is supported so as to be movable in the direction of the optical axis O by a first guide shaft and a second guide shaft (not shown) for regulating rotation held between a holding frame 62 that holds, for example, the front master lens 34 and a lens frame 64 of the rear master lens 38 that is provided at the rear end of the holding frame 62. A pair of voice coil motors (VCMs) 66 is provided in the holding frame 62 with the first guide shaft interposed therebetween. The focus lens 36 is operated by the electrical driving force of the VCM 66.

However, for example, the details of the first guide shaft, the second guide shaft, and the pair of VCMs 66 will be described below.

A first focus ring 70 and a second focus ring 72 are rotatably provided in an outer circumferential portion of the front fixed ring 12. The first focus ring 70 is arranged such that it can be endlessly rotated without any restrictions in the rotation range and slide in the optical axis direction. In addition, the second focus ring 72 is regulated by a stopper shape 74 such that it can be rotated in a range of about 120 degrees.

Sawtooth clutch portions 70A and 72A are formed on end surfaces facing the first focus ring 70 and the second focus ring 72, respectively. In the state shown in FIG. 1, the clutch portions 70A and 72A are connected to each other (engaged with each other) and the first focus ring 70 and the second focus ring 72 are integrally rotated. Therefore, in this state, it is possible to manually rotate the first focus ring 70 only in the range of about 120 degrees.

When the first focus ring 70 slides forward so as to ride over an elastic member 76 for clicking, the clutch portions 70A and 72A are disengaged from each other. In this way, the first focus ring 70 can be rotated endlessly. However, a click mechanism of the first focus ring 70 including the elastic member 76 for clicking will be described in detail below.

A driving portion (not shown) that also serves as a grip portion is attached to the side surface of the lens device 1 having the above-mentioned structure through screw holes 80 and 82.

The driving portion includes a driving unit for driving the zoom ring 50 and the iris ring 60 and has a control board provided therein. The driving portion is electrically driven by a seesaw-type zoom switch to control the driving of the zoom lens 32 and controls the focus lens 36 or the iris diaphragm 40.

<Various Detecting Units>

A linear potentiometer is provided on the outer circumferential surface of the first main ring 14 along the optical axis direction. When the zoom lens 32 is moved in the optical axis direction by the rotation of the cam cylinder 48, the linear potentiometer (zoom linear POT) outputs a position signal (a signal indicating an absolute position) corresponding to the moved position to the driving portion through a lead line.

A magnetic ring 84 having the N-pole and the S-pole magnetized thereto is adhered to the rear end surface of the cam cylinder 48. A magnetic sensor (MR sensor) is provided on the first main ring 14 so as to face the magnetic ring 84. When the magnetic ring 84 is rotated together with the cam cylinder 48, the MR sensor outputs a pulse signal (a signal indicating a relative position) with pulses corresponding to the amount of rotation to the driving portion through the lead line.

The output of the zoom linear POT is used when power is turned on and the output of a zoom position detecting MR sensor is used after power is turned on.

A focus lens position detecting MR sensor is provided in the holding frame 62 that faces the first guide shaft of the focus lens 36. The MR sensor outputs a pulse signal (a signal indicating the relative position) with pulses whose number corresponds to the amount of movement of the focus lens 36 to the driving portion through the lead line. However, for example, the details of the arrangement of the MR sensor will be described below.

A home position sensor (photo interrupter) for detecting the reference position of the focus lens 36 is provided in the holding frame 62. The driving portion counts the output signal of the MR sensor with respect to the reference position of the focus lens 36 detected by the home position sensor, thereby detecting the absolute position of the focus lens 36.

Gears 70B and 72B are respectively formed around the first focus ring 70 and the second focus ring 72. The gears 70B and 72B are respectively connected to gears of the detection shafts of the relative position detecting sensor (incremental encoder) and the absolute position detecting sensor (absolute encoder) provided in the driving portion.

In this way, the driving portion can detect the relative amount of rotation of the first focus ring 70 and can also detect the absolute rotational position of the second focus ring 72.

A photo interrupter 86 is provided at the leading end of the front fixed ring 12. A light shielding plate 70C is provided at the leading end of the first focus ring 70. The photo interrupter 86 outputs a detection signal indicating the presence or absence of the light shielding plate 70C to the driving portion. In this way, the driving portion can detect whether the first focus ring 70 is connected to the second focus ring 72 on the basis of the detection signal from the photo interrupter 86.

[Lens Control]

Figure 2:
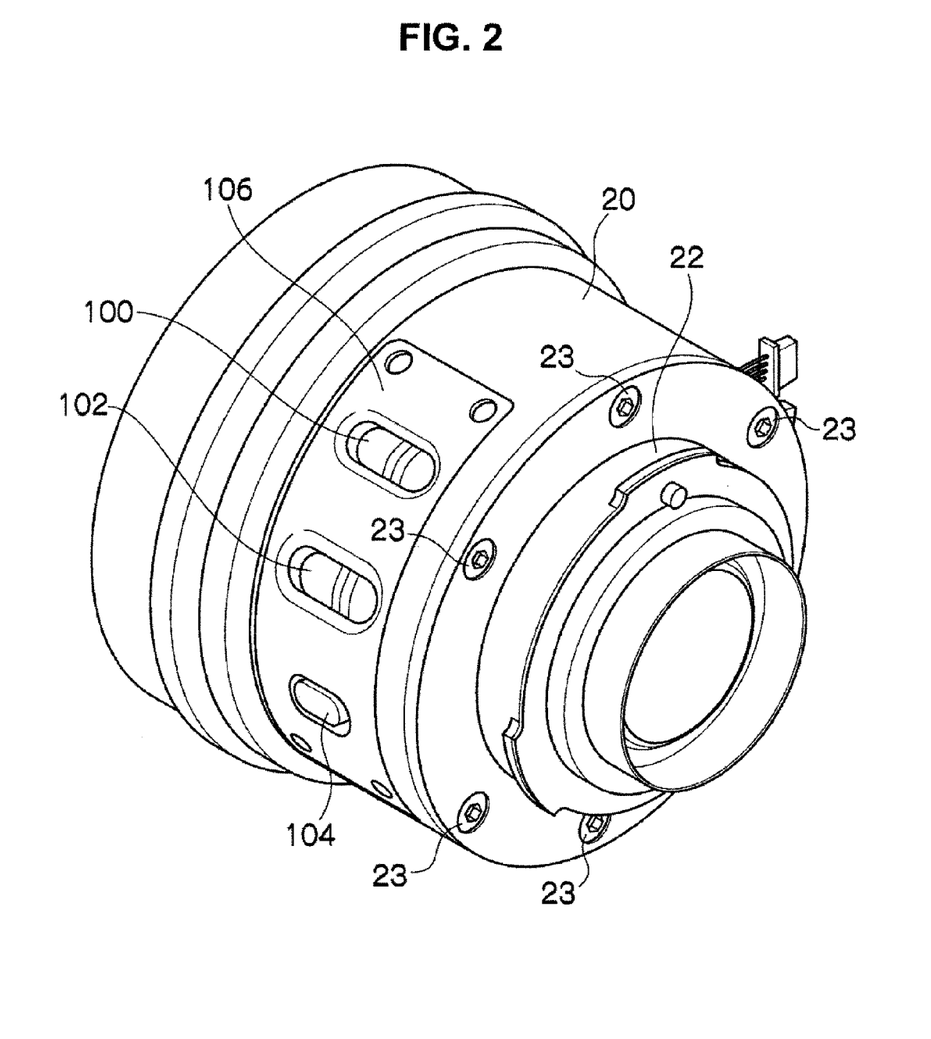
FIG. 2 is a perspective view illustrating the rear side of the lens device according to the embodiment of the invention.

As shown in FIG. 2, a slide-type macro ON/OFF switch 100, an AF/MF switch 102, and a non-locking AF push switch 104 are provided on the side surface of the mounting frame 20. When these switches are operated, output signals are transmitted to the driving portion through the lead lines.

The macro ON/OFF switch 100 is for turning on or off the macro imaging mode. The AF/MF switch 102 is for switching the operation mode between the auto-focus (AF) mode that automatically moves the focus lens 36 to adjust focus such that the contrast of an object image is the maximum and the manual focus (MF) mode in which the user manually rotates the first focus ring to move the focus lens 36, thereby adjusting the focus. The AF push switch 104 is for switching the operation mode to the AF mode during the period for which a key top is pushed when the operation mode is switched to the MF mode by the AF/MF switch 102.

Screw bosses for fixing the mount ring 22 including a lens mount for mounting a lens to a camera apparatus are formed on the mounting frame 20 at equal intervals in the circumferential direction of the mounting frame 20. The mount ring 22 is fixed to the rear end of the mounting frame 20 by the screw bosses and screws 23 with a hexagonal groove.

<Focus Control>

When the operation mode is switched to the AF mode by the AF/MF switch 102, the driving portion performs AF control to automatically move the focus lens 36 to the focus position regardless of the operation of the first focus ring 70 and the second focus ring 72.

When the operation mode is switched to the MF mode by the AF/MF switch 102, switching between the full MF mode (with an end) and the AF/MF mode (endless) is performed according to the slide position of the first focus ring 70.

That is, the driving portion can detect the slide position of the first focus ring 70 (whether the first focus ring 70 is connected to the second focus ring 72) on the basis of the detection signal from the photo interrupter 86. When the first focus ring 70 is connected to the second focus ring 72, the operation mode is switched to the full MF mode. When the first focus ring 70 is not connected to the second focus ring 72, the operation mode is switched to the AF/MF mode.

In the full MF mode in which the first focus ring 70 is connected to the second focus ring 72, the driving portion controls the driving of the focus lens 36 on the basis of an absolute position signal (a signal indicating the object distance in the range from a near point to infinity) from the absolute position detecting sensor that is connected to the gear 72B of the second focus ring 72 and a signal (a signal indicating the zoom ratio) indicating the absolute position of the zoom position obtained from the output of the zoom linear POT when power is turned on and the output of the zoom position detecting MR sensor after power is turned on. That is, the movement position of the focus lens 36 corresponding to the object distance is set according to the current zoom position (zoom ratio) of the zoom lens 32 in advance, and when the second focus ring 72 is rotated in operative association with the manual operation of the first focus ring 70, the driving portion moves the focus lens 36 to a corresponding position on the basis of a signal (a signal indicating the object distance) indicating the rotational position and the current zoom ratio.

As such, when the operation mode is switched to the full MF mode, it is possible to manually operate the first focus ring 70 to move the focus lens 36 to a position corresponding to a desired object distance. However, since the first focus ring 70 is connected to the second focus ring 72 with an end where the rotation range is restricted by the stopper shaft 74, the rotation range of the first focus ring 70 is restricted similarly to the second focus ring 72 such that the first focus ring 70 can be rotated in a rotation range corresponding to the range from the near end to the infinite end.

In the full MF mode, the rotation range of the first focus ring 70 is restricted by the second focus ring 72, and the operator can recognize whether the focus lens 36 reaches the near end or the infinite end on the basis of an operational feeling when the first focus ring 70 reaches the end. The method of using only the first focus ring 70 to adjust focus is generally used by the camera man.

In the AF/MF mode in which the first focus ring 70 is not connected to the second focus ring 72, it is possible to perform focus control by appropriately using the MF mode in which the user rotates the first focus ring 70 to move the focus lens 36 and the AF mode performed when the AF push switch is pushed.

That is, when the first focus ring 70 is operated in the AF/MF mode and a relative position signal is input from the relative position detecting sensor connected to the gear 70B of the first focus ring 70, the driving portion controls the driving of the focus lens 36 on the basis of the relative position signal and moves the focus lens 36 by a distance corresponding to the amount of rotation of the first focus ring 70.

However, in the AF/MF mode, since the first focus ring 70 is not connected to the second focus ring 72, the first focus ring 70 can be endlessly rotated without any restriction in the rotation range. When the focus lens 36 is moved up to the infinite end or the near end, the driving portion does not output an instruction to move over the end.

In the AF/MF mode, when the AF push switch 104 is pushed to temporarily switch the operation mode to the AF mode and the user takes the hand off the AF push switch 104 to switch the operation mode to the MF mode, it is possible to displace the focus lens 36 by a distance corresponding to the operation of the first focus ring 70 from the position of the focus lens 36 that is automatically focused by the AF mode. Therefore, it is possible to improve user convenience.

<Zoom Control>

When the seesaw-type zoom switch provided in the driving portion is operated, the rotational driving force of the electric motor in the driving portion is transmitted to the gear 50A that is formed around the zoom ring 50 to rotate the zoom ring 50. In addition, it is possible to manually operate the zoom ring 50 (a zoom lever (not shown) provided in the zoom ring 50) to rotate the zoom ring 50.

When the zoom ring 50 is rotated, the cam cylinder 48 connected to the zoom ring 50 through the connection shaft 52 is rotated. When the cam cylinder 48 is rotated, the moving frame 46 is moved forward and backward in the direction of the optical axis O through the straight-ahead groove 14A formed in the first main ring 14 and the cam pin 46A fitted to the cam groove 48A of the cam cylinder 48. As such, it is possible to rotate the zoom ring 50 to move the zoom lens 32 in the direction of the optical axis O, thereby changing the zoom ratio.

When the zoom ratio is changed by the movement of the zoom lens 32 in this way, the focal plane is moved. The driving portion controls the position of the focus lens 36 which is used as a correction optical system for correcting the movement of the focal plane due to the change in the zoom ratio such that the focal plane is not moved regardless of the zoom ratio.

That is, the driving portion acquires the current zoom position of the zoom lens 32 before a zooming operation from the output of the zoom linear POT when power is turned on and the output of the zoom position detecting MR sensor after power is turned on, and acquires the current position of the focus lens 36 from the output of the focus lens position detecting MR sensor. Then, the driving portion selects a corresponding correction curve from the correction curves indicating the relationship between the focus lens position and the zoom position where the focal plane prepared for each object distance in advance is not moved, on the basis of the acquired zoom position and focus lens position. When the amount of movement of the zoom lens 32 is detected on the basis of the output signal of the zoom lens position detecting MR sensor, the driving portion reads a focus lens position (focus lens position where the focal plane is not moved) corresponding to the detected zoom position from the selected correction curve and moves the focus lens 36 to the read focus lens position.

In this way, it is possible to prevent the movement of the focal plane (defocus) even though the zoom ratio is changed after the focus is adjusted such that the focal plane is disposed on an imaging device of a camera body having the lens device 1 mounted thereto by focus control.

In this way, it is possible to prevent the movement of the focal plane even though the zoom ratio is changed. Therefore, once focus is adjusted by focus control such that the focal plane is disposed on the imaging device of the camera body having the lens device 1 mounted thereto, it is possible to prevent defocusing even though a zoom operation is performed.

EMBODIMENTS

Next, the structure of the mounting frame 20 applied to the lens device 1 having the above-mentioned structure and a method of attaching an internal structure to the inside of the mounting frame 20 will be described.

Figure 3:
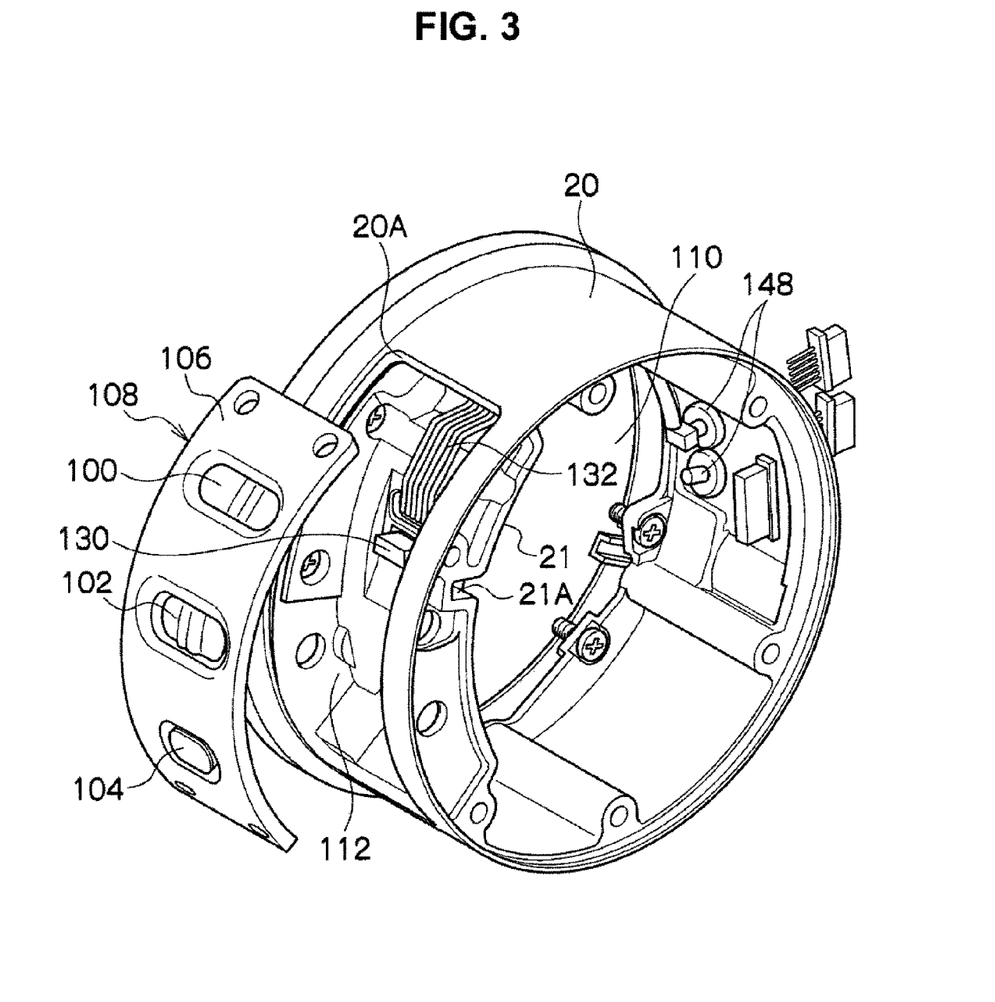
FIG. 3 is a perspective view illustrating a cylindrical mounting frame that is provided on the rear side of a lens barrel body having, for example, a focus lens and a voice coil motor accommodated therein.
Figure 4:
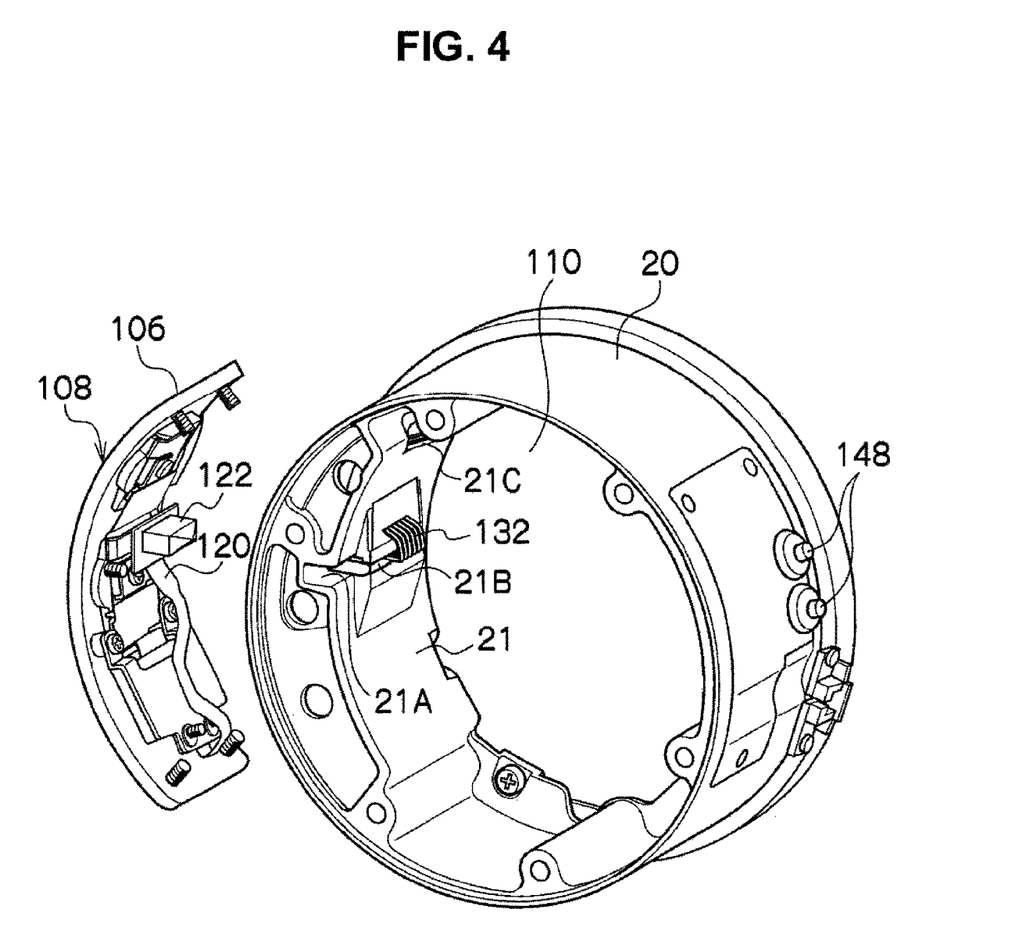
FIG. 4 is a perspective view illustrating the mounting frame as viewed in another direction.
Figure 5:
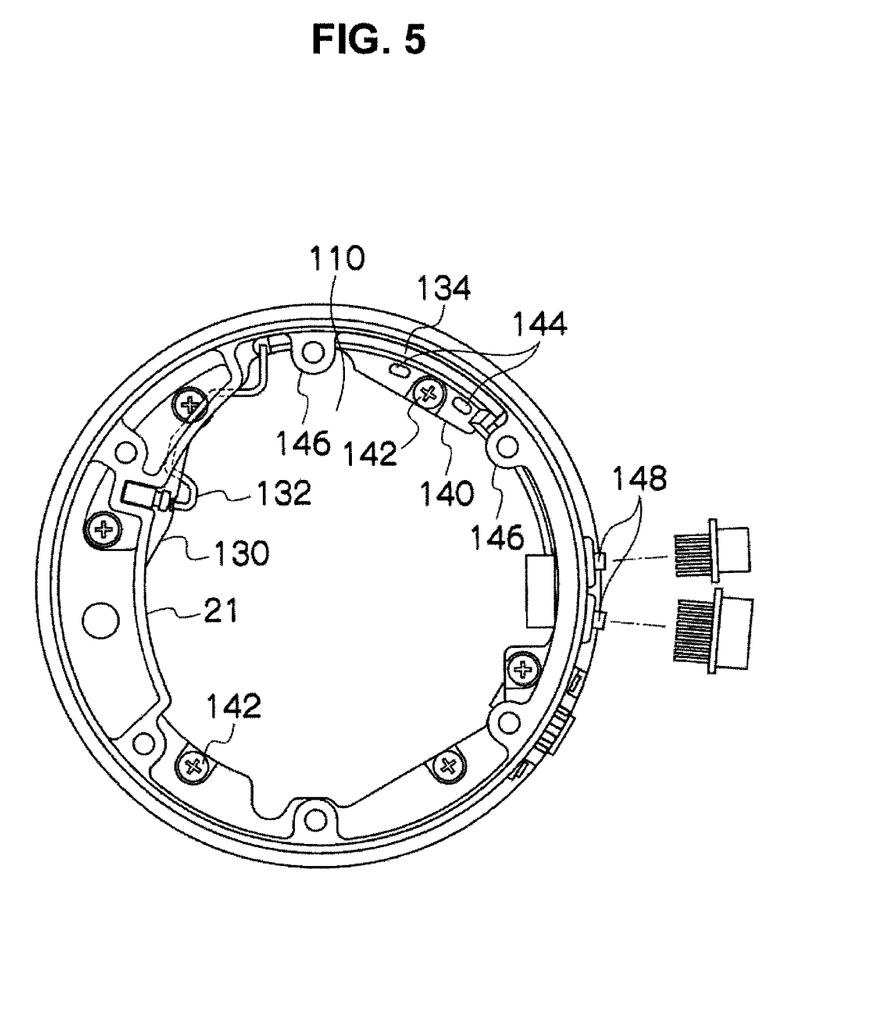
FIG. 5 is a plan view illustrating the mounting frame.
Figure 6:
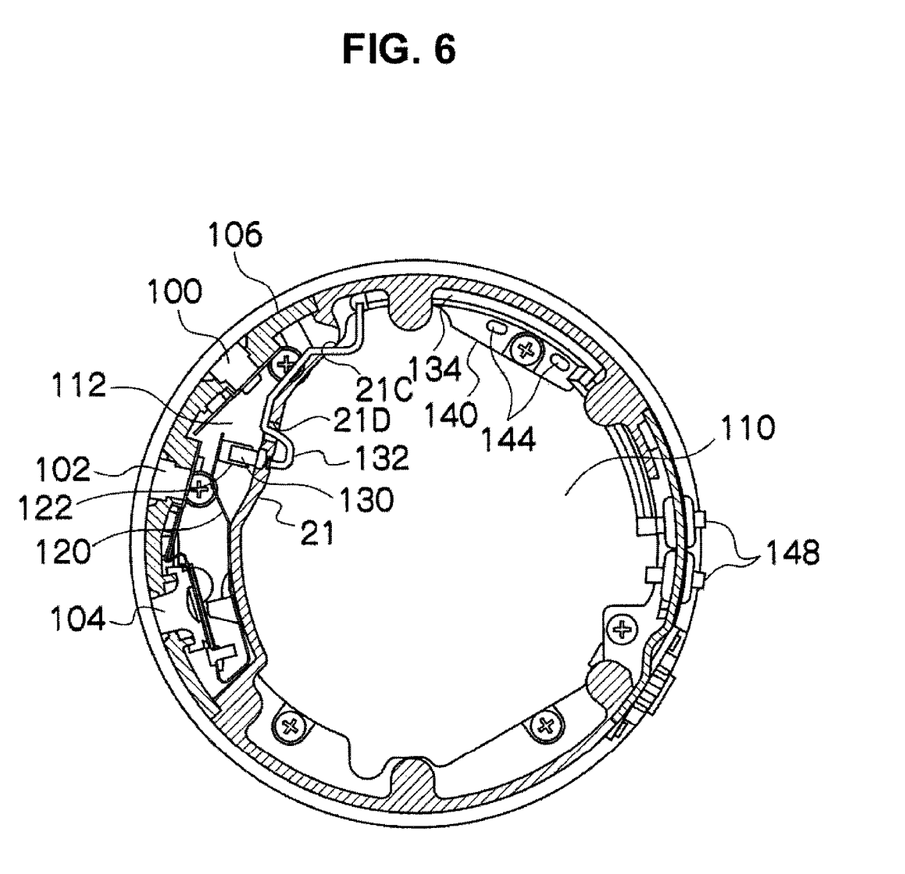
FIG. 6 is a cross-sectional view illustrating the mounting frame.
Figure 7:
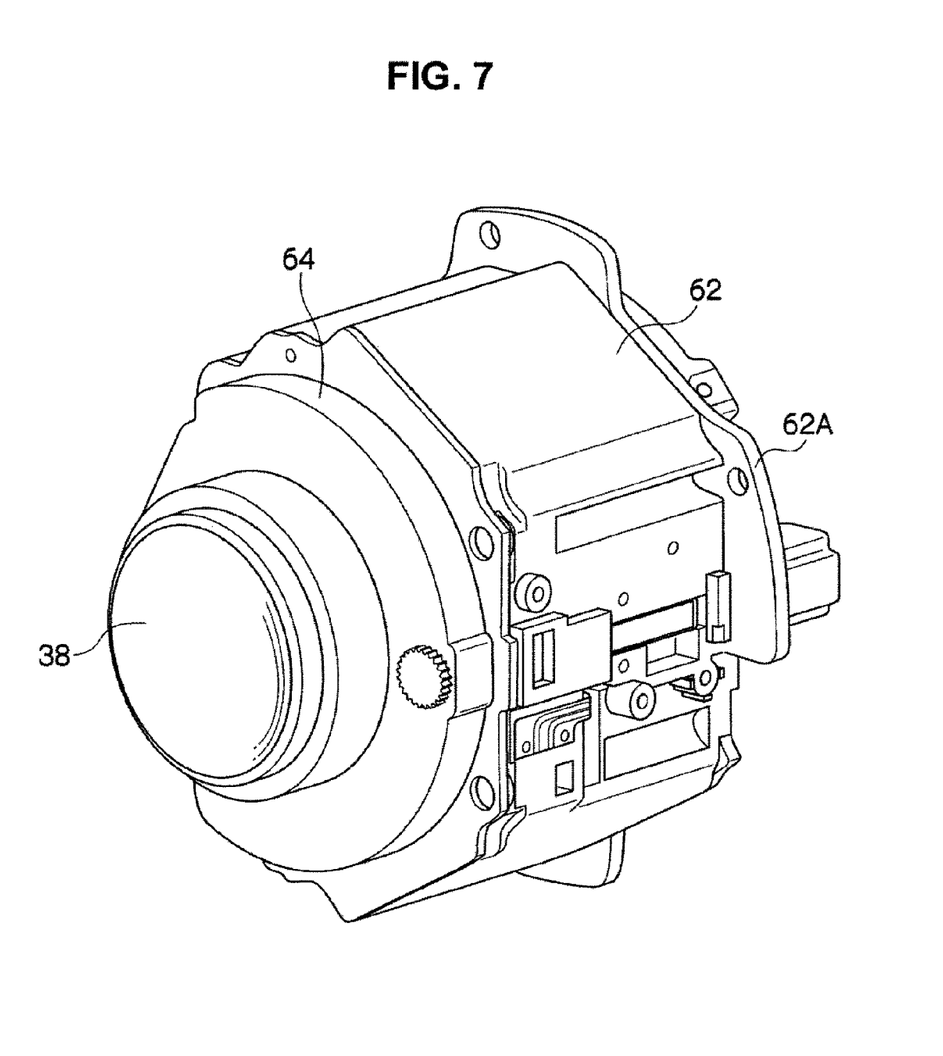
FIG. 7 is a perspective view illustrating the outward appearance of, for example, a holding frame in the mounting frame.

FIGS. 3 and 4 are perspective views illustrating the mounting frame 20. FIG. 5 is a plan view illustrating the mounting frame 20 and FIG. 6 is a cross-sectional view illustrating the mounting frame 20. FIG. 7 is a perspective view illustrating the outward appearance of the holding frame 62 in the mounting frame 20.

The mounting frame 20 is integrally formed by aluminum die casting and has a cylindrical shape. An inner wall 21 is formed in the mounting frame 20, and the inner wall 21 partitions the inside of the mounting frame 20 into a first space 110 in which the holding frame 62 (FIG. 7) is accommodated and a second space 112 in which a switch assembly 108 including the macro ON/OFF switch 100, the AF/MF switch 102, and the AF push switch 104 is accommodated (see FIG. 6).

As shown in FIG. 3, an opening 20A of the second space 112 to which the switch assembly 108 is attached is formed in the side surface of the mounting frame 20.

The opening 20A is formed over one-third of the circumference of the mounting frame 20, and the inner wall 21 is formed inside the mounting frame at a position facing the opening 20A. Therefore, the strength of the mounting frame 20 is ensured and the accuracy of parts formed by molding is not reduced.

As shown in FIG. 4, the macro ON/OFF switch 100, the AF/MF switch 102, and the AF push switch 104 attached to the switch cover 106 are connected to a female connector 122 that is mounted on the flexible printed circuit board (FPC) 120 through the FPC 120.

A male connector 130 connected to the female connector 122, a plurality of lead lines 132 connected to the male connector 130, and one cable 134, which is a bundle of the lead lines 132, are attached to the mounting frame 20.

Next, the attachment of the male connector 130, the lead lines 132, and the cable 134 to the mounting frame 20 will be described.

First, the attachment of the male connector 130 to the mounting frame 20 will be described.

Figure 8:
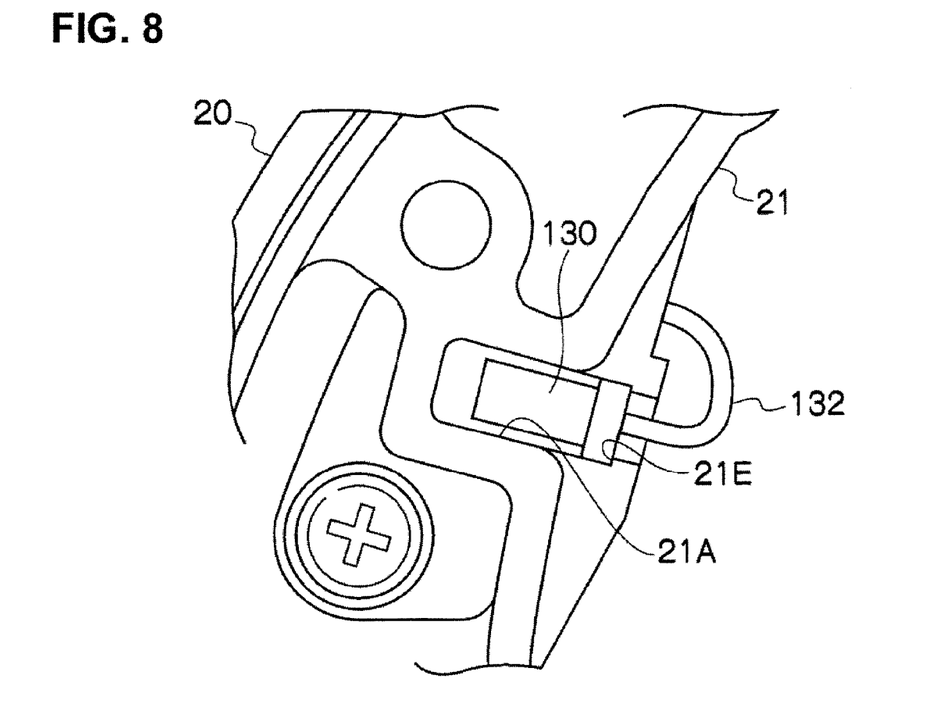
FIG. 8 is an enlarged view illustrating a main part of the mounting frame.
Figure 9:
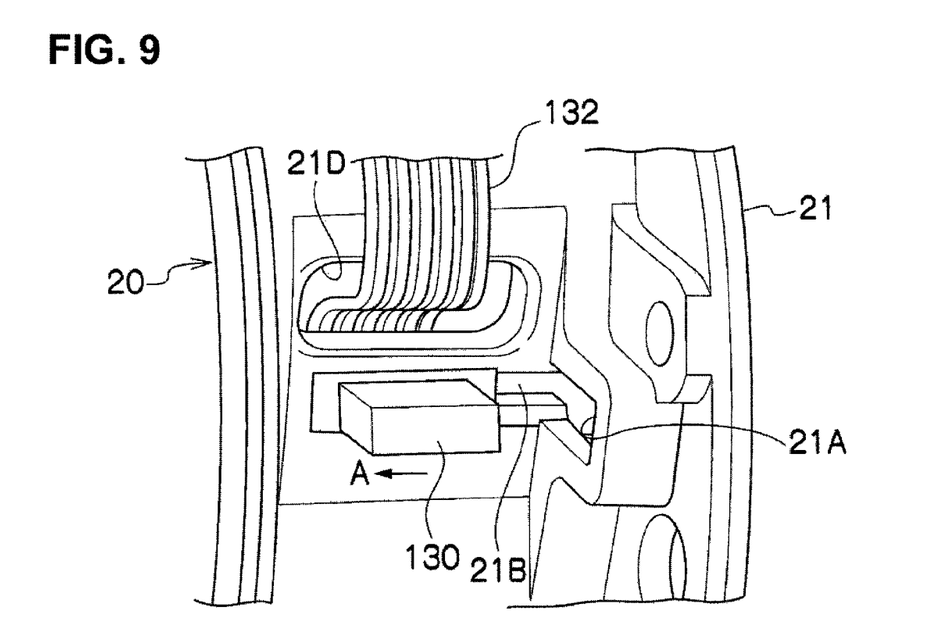
FIG. 9 is a perspective view illustrating a main part of the side surface of the mounting frame on which a switch assembly is provided.

FIG. 8 is an enlarged view illustrating a main part of the mounting frame 20 shown in FIG. 5, and FIG. 9 is a perspective view illustrating a main part of the side surface of the mounting frame 20 in which the switch assembly 108 is provided.

As shown in FIGS. 8 and 9, a U-shaped cut-out portion 21A along which the male connector 130 slides in the optical axis direction and is then inserted from the first space 110 into the second space 112 and a slit portion 21B (FIG. 9) which communicates with the cut-out portion 21A in the optical axis direction and into which the lead lines 132 are inserted are formed in the inner wall 21 of the mounting frame 20. However, the edge of the U-shaped cut-out portion 21A and the front and rear sides of the slit portion 21B are formed with a large thickness such that the strength of the inner wall 21 is not reduced.

In addition, two openings 21C and 21D through which the male connector 130 can pass are formed in the inner wall 21 of the mounting frame 20. The male connector 130 including a plurality of flat lead lines 132 connected in parallel to each other is inserted from the first space 110 into the second space 112 through the opening 21C and then inserted from the second space 112 into the first space through the opening 21D. In this way, the lead lines 132 extend along the inner wall 21 (FIGS. 5 and 6).

As shown in FIG. 9, the male connector 130 slides in the direction of an arrow A (optical axis direction) through the U-shaped cut-out portion 21A and is then inserted into the second space 112. In this case, the male connector 130 is inserted to the end in the direction of the arrow A. In this embodiment, the lead lines 132 are fixed by an adhesive tape such that the male connector 130 does not slide. However, as shown in FIG. 8, the rear surface of the male connector 130 comes into contact with a contact surface 21E of the inner wall 21 to prevent the movement of the male connector 130 in the inside diameter direction.

Then, the female connector 122 attached to the switch cover 106 shown in FIG. 4 is connected to the male connector 130 arranged on the inner wall 21.

Figure 10:
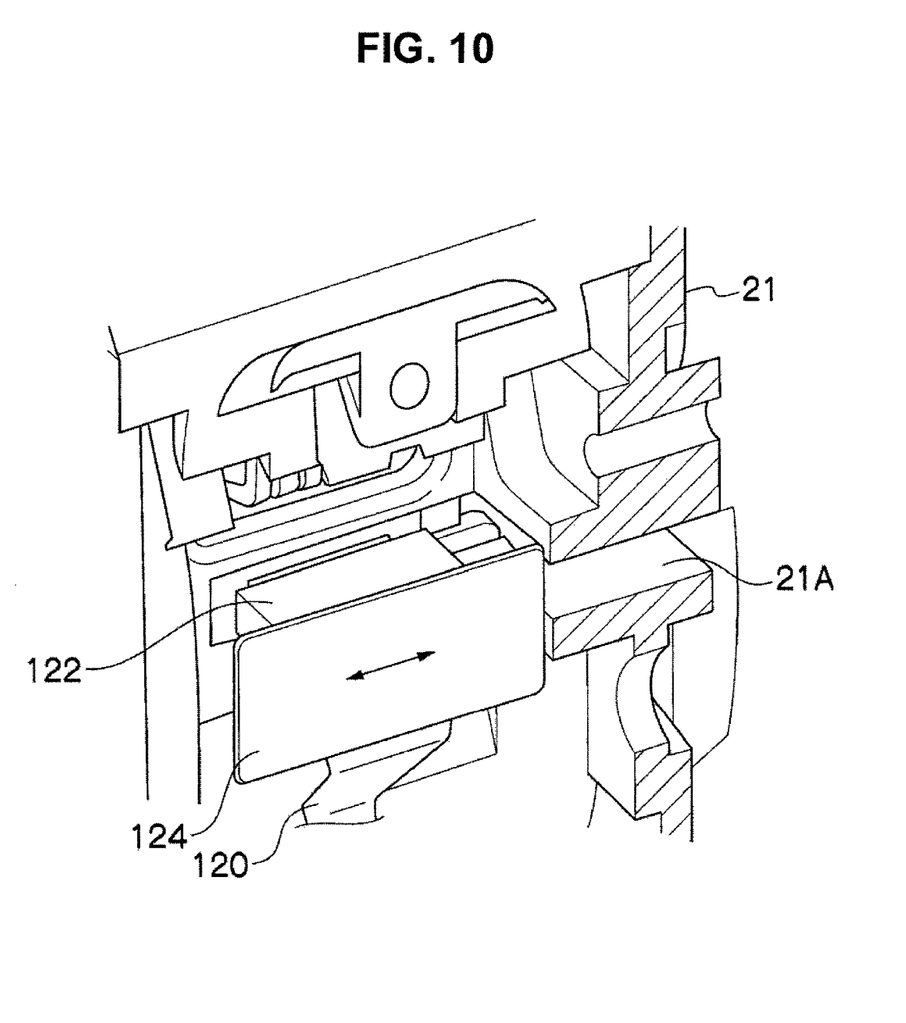
FIG. 10 is a perspective view illustrating a main part of the side surface of the mounting frame, with a female connector of the switch assembly connected to a male connector.

FIG. 10 is a perspective view illustrating a main part of the mounting frame 20 with the female connector 122 of the switch assembly 108 connected to the male connector 130. As shown in FIG. 10, a reinforcing plate 124 is provided on the rear surface of the FPC 120 having the female connector 122 mounted thereon, and the reinforcing plate 124 comes into contact with the side surface of the U-shaped cut-out portion 21A to prevent the sliding of the male connector 130 (movement in the direction of the arrow). That is, when the female connector 122 is connected to the male connector 130 and then the switch cover 106 is fixed to the mounting frame 20, the connectors 122 and 130 are not removed from each other and the sliding thereof is prevented.

Next, the attachment (wiring) of the cable 134 to the mounting frame 20 will be described.

As shown in FIG. 5, a flange portion 140 having six screw holes for fixing the rear fixed ring 18 to the mounting frame 20 is formed in the mounting frame 20 and the mounting frame 20 can be fixed to the rear fixed ring 18 by six screws 142.

Figure 11:
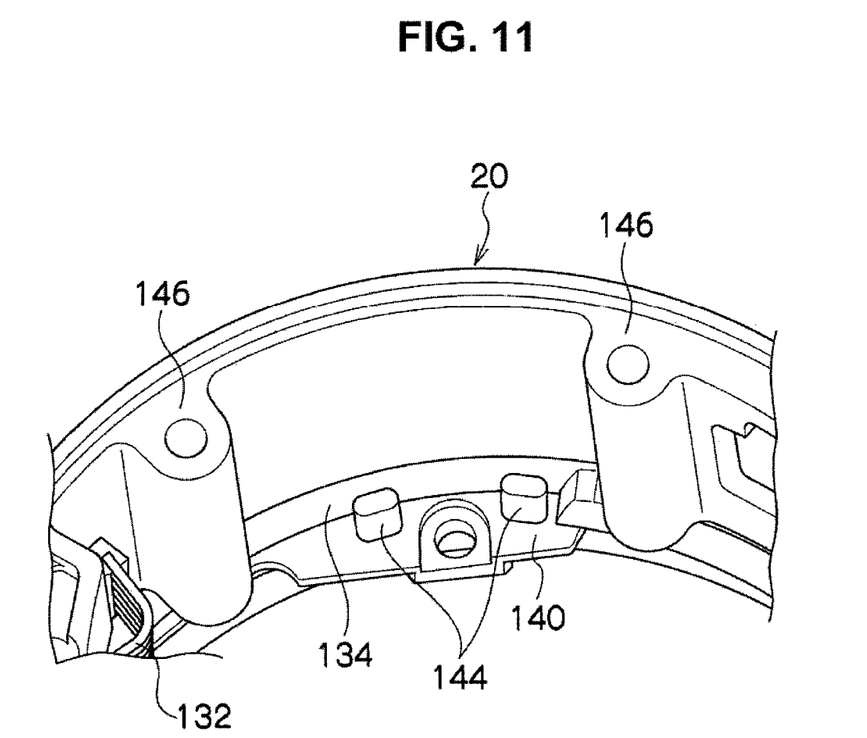
FIG. 11 is an enlarged perspective view illustrating a main part of the mounting frame including a flange portion.

FIG. 11 is an enlarged perspective view illustrating a main part of the mounting frame 20 including the flange portion 140.

As shown in FIG. 11, two cable holding bosses 144 are formed in a part of the flange portion 140. In addition, six screw bosses 146 for fixing the mount ring 22 are formed on the mounting frame 20 at equal intervals in the circumferential direction of the mounting frame 20. As shown in FIG. 11, a gap is formed between the lower surface of the screw boss 146 and the flange portion 140.

Lead line outlets 148 are formed in a portion of the outer circumferential surface of the mounting frame 20 opposite to the switch cover 106 (see FIGS. 3 to 6).

As described above, one cable 134, which is a bundle of a plurality of flat lead lines 132, extends among the flange portion 140 of the mounting frame 20, the cable holding bosses 144, and the inner wall and among the flange portion 140, the lower surfaces of the screw bosses 146, and the inner wall, and is then drawn out from the lead line outlets 148.

As described above, the macro ON/OFF switch 100, the AF/MF switch 102, and the AF push switch 104 attached to the switch cover 106 may be connected to the driving portion provided outside the lens barrel body through the FPC 120, the female connector 122, the male connector 130, lead lines 132, and the cable 134.

The above-mentioned structure in which the lead lines 132 and the cable 134 are arranged in the mounting frame 20 makes it possible to prevent interference when the lead lines 132 are fixed to the rear fixed ring 18 of the mounting frame 20 and when the internal structure, which will be described below, is fixed. In addition, it is possible to fix the lead lines 132 to the mounting frame 20 without increasing the number of parts.

Next, the internal structure accommodated in the first space 110 of the mounting frame 20 will be described.

FIG. 7 shows the outward appearance of the internal structure (holding frame 62) in which the focus lens 36, the VCM 66, and a magnetic sensor 150, which is a lens position detecting unit detecting the position of the focus lens 36, are arranged. The holding frame 62 may be fixed to the rear fixed ring 18 by the flange portion 62A of the holding frame 62.

Figure 12:
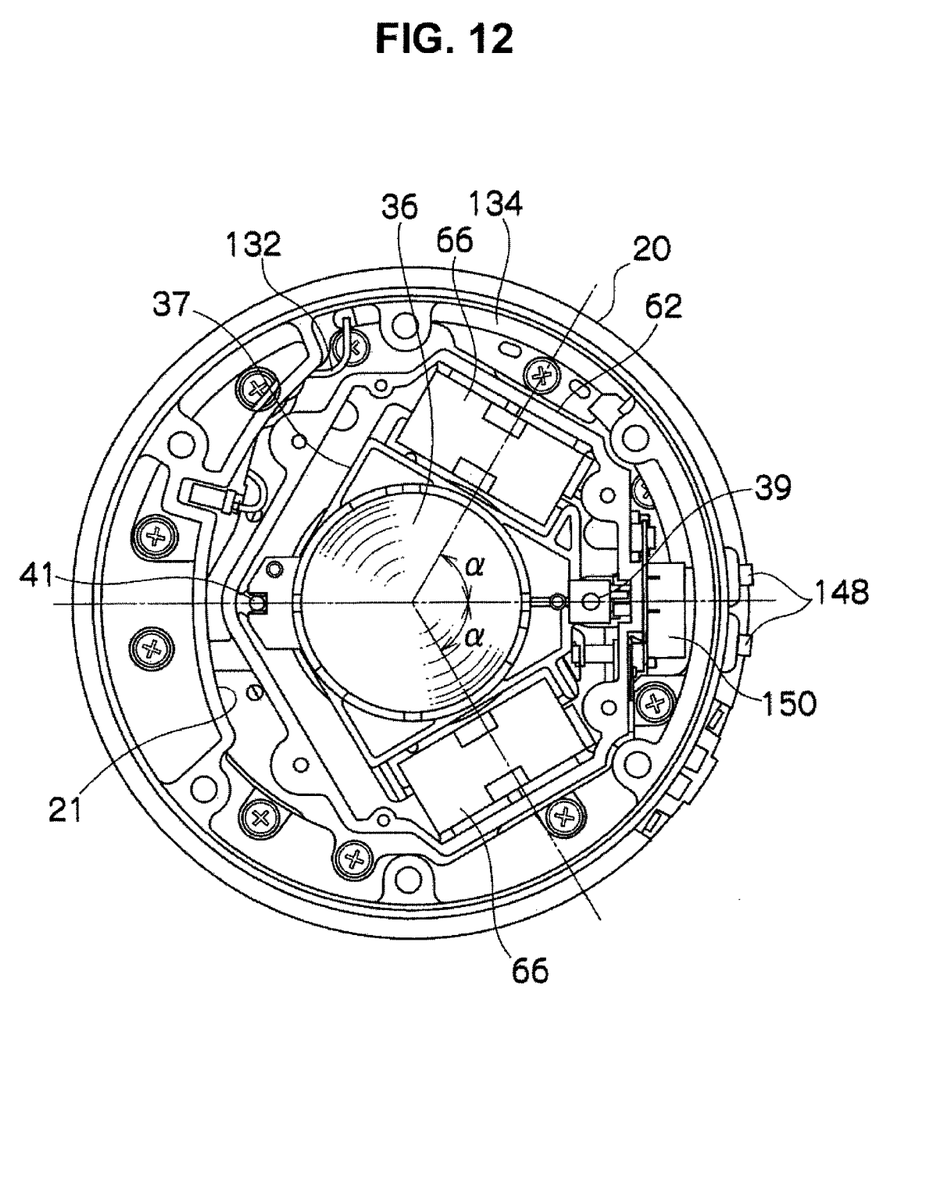
FIG. 12 is a plan view illustrating the mounting frame having an internal structure accommodated therein.

FIG. 12 is a plan view illustrating the mounting frame 20 having the internal structure accommodated therein, in which the lens frame 64 of the rear master lens 38 provided at the rear end of the holding frame 62, which is the internal structure, is removed.

As shown in FIG. 12, the focus lens 36 is held by the focus lens frame 37, and the focus lens frame 37 is guided by a first guide shaft 39, which is a standard for movement in the optical axis direction, and a second guide shaft 41 for regulating rotation so as to be movable in the optical axis direction.

A pair of VCMs 66 each has a rectangular parallelepiped shape including a yoke with a magnet and a voice coil. The yoke is fixed to the holding frame 62 and the voice coil is fixed to the focus lens frame 37.

A magnetic scale in which the N-pole and the S-pole of the linear MR sensor 150 are magnetized at a predetermined pitch is provided in a bearing portion through which the first guide shaft 39 of the focus lens frame 37 passes. The MR sensor 150 detecting the N-pole and the S-pole of the magnetic scale is provided in the holding frame 62 facing the magnetic scale.

That is, the MR sensor 150 is disposed at the position where it faces the focus lens 36 with the first guide shaft 39 interposed therebetween and is arranged adjacent to the first guide shaft 39. In this way, the MR sensor 150 can accurately detect the position of the focus lens 36.

The pair of VCMs 66 is arranged at a position to be symmetric with respect to the first guide shaft 39 and as close as possible to the first guide shaft 39 such that the focus lens 36 can be smoothly moved. In this embodiment, the angle α between a segment passing through the optical axis and the first guide shaft 39 and a segment passing through the optical axis and the center of the VCM 66 is about 60 degrees.

As described above, since the pair of VCMs 66 and the MR sensor 150 are arranged close to the first guide shaft 39, which is a reference point, the holding frame 62 has an outward shape in which a portion close to the second guide shaft 41 with respect to the optical axis is smaller than another portion close to the first guide shaft 39. Therefore, when the holding frame 62 is provided in the mounting frame 20, an empty space formed between the mounting frame 20 and the holding frame 62 close to the second guide shaft 41 is larger than that formed between the mounting frame 20 and the holding frame 62 close to the first guide shaft 39.

In this embodiment of the invention, the inner wall 21 is formed in the empty space of the mounting frame 20 at a position where it does not interfere with the holding frame 62 provided in the mounting frame 20.

However, the number and kinds of switches in the switch assembly that is provided on the side of the mounting frame are not limited to the above-described embodiment.

The invention is not limited to the above-described embodiment, but various kinds of modifications and changes of the invention can be made without departing from the scope and spirit of the invention.

What is claimed is:

1. A rear-focus-type lens device comprising:
an attachment frame that is provided on the rear side of a lens barrel body; and
an internal structure that includes a focus lens and is provided in the attachment frame,
wherein the attachment frame includes:
an inner wall that is provided inside the attachment frame and partitions the inside of the attachment frame into a first space which accommodates the internal structure and a second space which accommodates a switch assembly including a plurality of switches for operating the lens device, and the plurality of switches are arranged in a circumferential direction of the attachment frame;
an opening of the second space which is formed in the side surface of the attachment frame and to which the switch assembly is attached; and
a cover to which the switch assembly including the plurality of switches are attached, the cover covering the opening of the second space,
wherein the inner wall is opposed to the opening, and
wherein the strength of the attachment frame is reinforced by the inner wall, and
wherein the internal structure includes:
the focus lens,
a focus lens driving unit that drives the focus lens in the optical axis direction,
a lens position detecting unit that detects the position of the focus lens, and
a holding frame having the focus lens, the focus lens driving unit, and the lens position detecting unit provided therein, wherein the holding frame is provided with a first guide shaft, which is a standard for guiding a focus lens frame holding the focus lens so as to be movable in the optical axis direction, and a second guide shaft for regulating rotation, the lens position detecting unit is provided at a position where it faces the focus lens with the first guide shaft interposed therebetween, and a pair of the focus lens driving units is arranged at a position to be symmetric with respect to the first guide shaft, and wherein lead line outlets are formed in a portion of the outer circumferential surface of the attachment frame close to the first guide shaft, and each of the switches in the switch assembly attached to the attachment frame is electrically connected to a driving portion that is provided outside the lens barrel body through a flexible printed circuit board, a first connector mounted on the flexible printed circuit board, a second connector connected to the first connector, and a plurality of lead lines which is connected to the second connector and is drawn out from the lead line outlets.

2. The lens device according to claim 1, wherein the attachment frame has a cylindrical shape, and the holding frame has an outward shape in which a portion close to the second guide shaft with respect to the optical axis is smaller than another portion close to the first guide shaft.

3. The lens device according to claim 1, wherein a U-shaped cut-out portion and a slit portion are formed in the inner wall, the U-shaped cut-out portion allows the second connector to slide in the optical axis direction and be inserted from the first space into the second space, and the slit portion communicates with the cut-out portion in the optical axis direction and the lead lines are inserted into the slit portion.

4. The lens device according to claim 3, wherein a reinforcing plate is provided on the rear surface of the flexible printed circuit board having the first connector mounted thereon, and when the first connector is connected to the second connector, the reinforcing plate comes into contact with the side surface of the U-shaped cut-out portion protruding into the first space to prevent the sliding of the second connector.

5. The lens device according to claim 1, wherein two openings through which the second connector passes are formed in the inner wall, and the second connector passes through the two openings such that the lead lines connected to the rear end of the second connector extend along the inner wall.

6. The lens device according to claim 5, wherein a flange portion and a plurality of screw bosses are formed on the attachment frame, the flange portion attaches the attachment frame to the rear side of the lens barrel body and a cable holding boss is formed in a part of the flange portion, the plurality of screw bosses fixes a mount ring including a lens mount to the rear side of the attachment frame, and a cable, which is a bundle of the plurality of lead lines in the first space, extends among the flange portion of the attachment frame, the cable holding boss, and the inner wall and among the flange portion of the attachment frame, the lower surface of the screw boss, and the inner wall and is drawn out from the lead line outlet.

* * * * *